United States Patent
Przytulla et al.

(10) Patent No.: US 6,773,249 B1
(45) Date of Patent: Aug. 10, 2004

(54) EXTRUSION HEAD

(75) Inventors: Dietmar Przytulla, Kerpen (DE); Peter Langos, St. Augustin (DE)

(73) Assignee: Mauser-Werke GmbH, Brühl (DE)

( * ) Notice: Subject to any disclaimer, the term of this patent is extended or adjusted under 35 U.S.C. 154(b) by 0 days.

(21) Appl. No.: 09/623,773
(22) PCT Filed: Mar. 4, 1999
(86) PCT No.: PCT/EP99/01398
§ 371 (c)(1), (2), (4) Date: Sep. 5, 2000
(87) PCT Pub. No.: WO99/44805
PCT Pub. Date: Sep. 10, 1999

(30) Foreign Application Priority Data

Mar. 5, 1998 (DE) .................................. 298 03 780 U

(51) Int. Cl.[7] ................................................ B29C 47/22
(52) U.S. Cl. ....................... 425/141; 425/381; 425/465; 425/466
(58) Field of Search ................. 425/141, 532, 425/381, 465, 466

(56) References Cited

U.S. PATENT DOCUMENTS

| 3,114,932 A | | 12/1963 | Donnelly | |
|---|---|---|---|---|
| 3,453,690 A | * | 7/1969 | Mayner | 425/192 R |
| 4,171,195 A | * | 10/1979 | Klein et al. | 425/141 |
| 4,279,857 A | * | 7/1981 | Feuerherm | 425/465 |
| 4,382,766 A | * | 5/1983 | Feuerherm | 425/465 |
| 4,422,839 A | * | 12/1983 | Przytulla et al. | 425/465 |
| 4,432,718 A | * | 2/1984 | Wurzer | 425/466 |
| 5,057,267 A | * | 10/1991 | Seizert et al. | 425/381 |
| 6,024,557 A | * | 2/2000 | Feuerherm | 425/532 |
| 6,284,169 B1 | * | 9/2001 | Feuerherm et al. | 264/40.1 |
| 6,354,828 B1 | * | 3/2002 | Feuerherm et al. | 425/532 |

FOREIGN PATENT DOCUMENTS

| DE | 26 54 001 A | 6/1978 |
|---|---|---|
| EP | 0 478 957 A | 4/1992 |
| EP | 0 885 711 A | 12/1998 |
| GB | 1 107 628 | 3/1968 |

* cited by examiner

Primary Examiner—Robert Davis
Assistant Examiner—Joseph S Del Sole
(74) Attorney, Agent, or Firm—Henry M. Feiereisen; Ursula B. Day

(57) ABSTRACT

The invention relates to an extrusion head for producing a tubular parison (22) in order to manufacture large-volume, blow molded plastic hollow bodies. The inventive extrusion head has an adjustable ring-shaped tube outlet nozzle for selectively adjusting the nozzle opening (20) in order to alter the wall thickness of the exiting parison (22). In order to provide a multiple adjustability of the extruded tube cross section, the invention provides that the extrusion head comprises at least three separate nozzle/mandrel gap adjustment elements (D 0=mandrel, DS I, DS II, DS III) which are differently profiled and exchangeable. The elements can be individually and/or simultaneously brought into working contact with the exiting parison (22) in the mandrel gap (20) from inside and/or outside, whereby at least two of the adjustment elements (D 0=mandrel, DS I, DS II, DS III) are configured such that they can be adjusted. To this end, the at least two adjustment elements are each equipped with a corresponding adjusting drive.

15 Claims, 14 Drawing Sheets

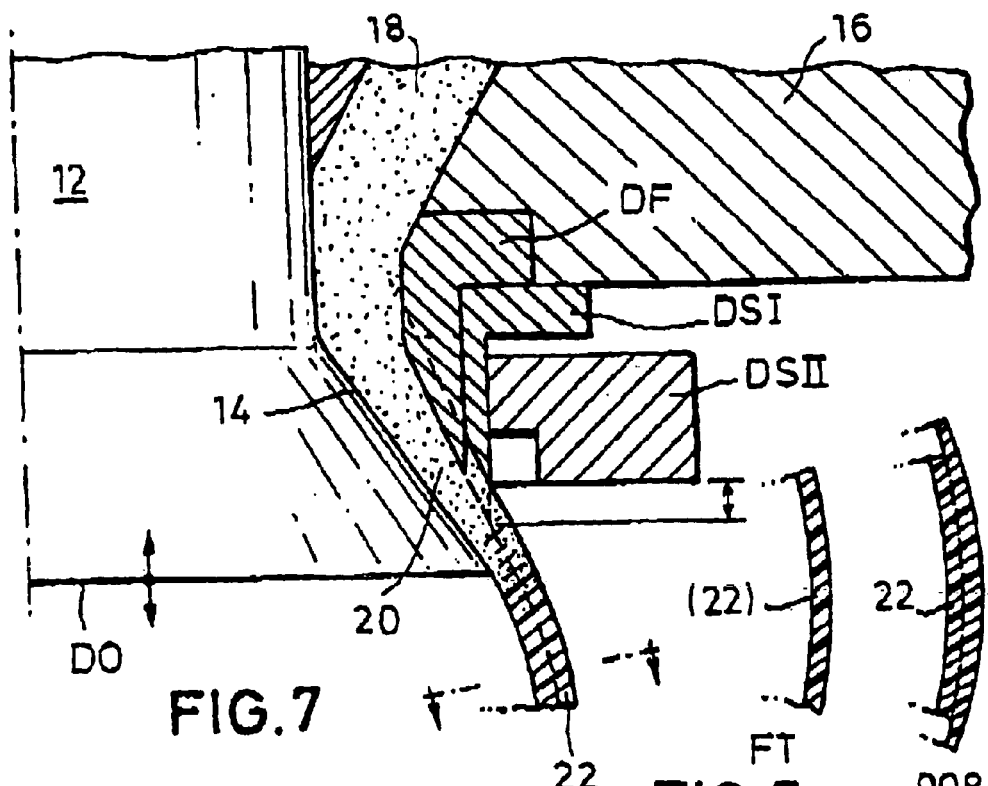
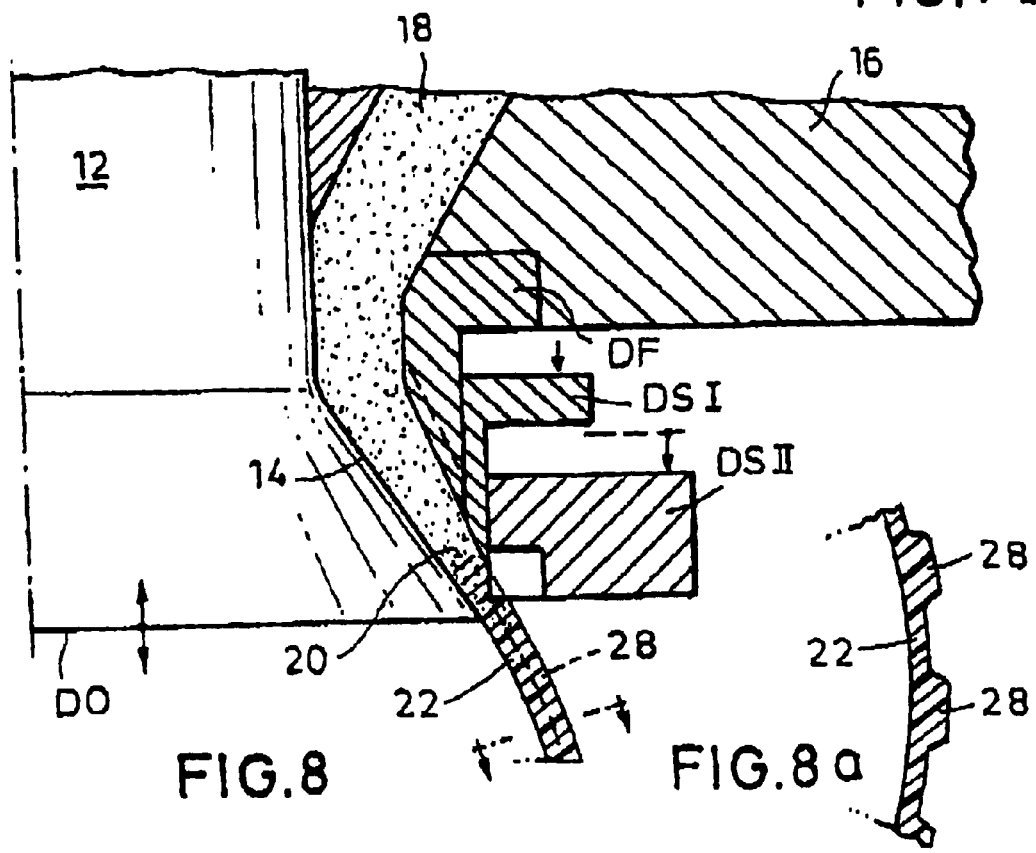

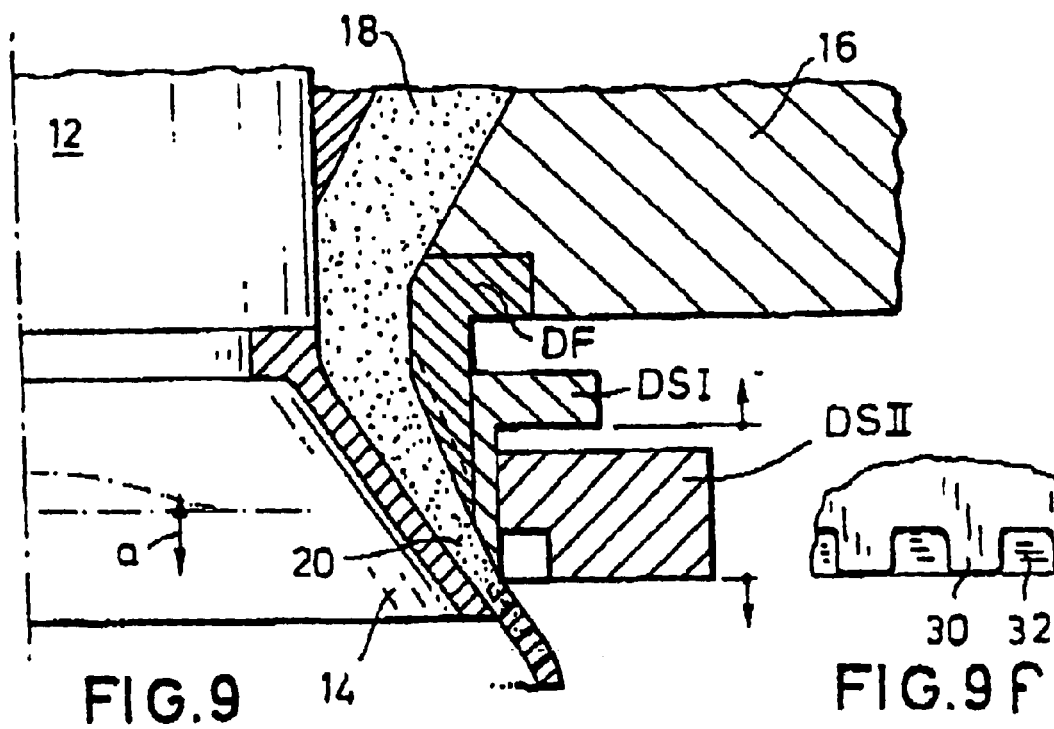
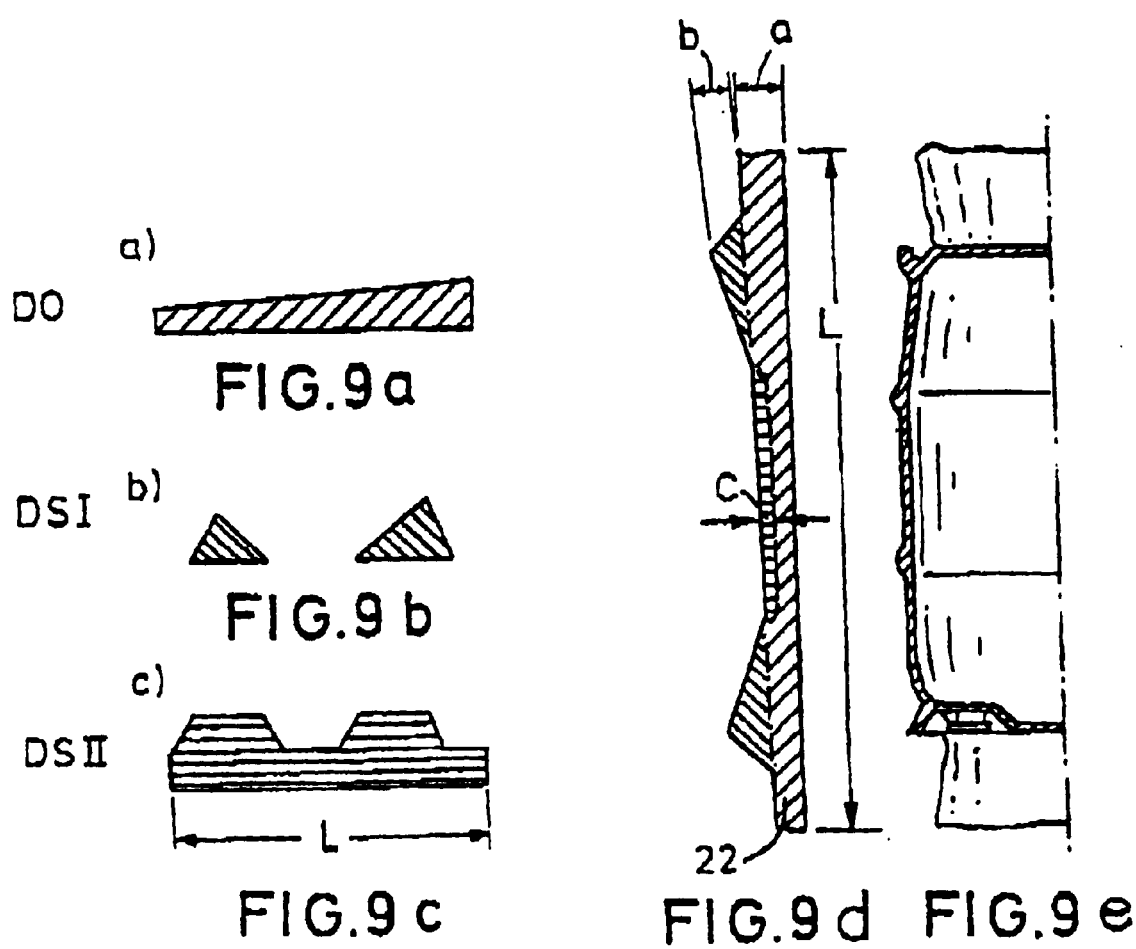

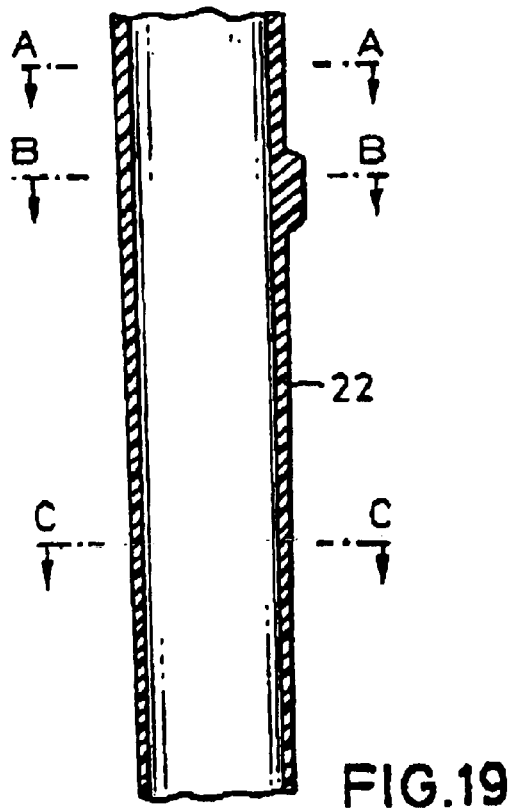
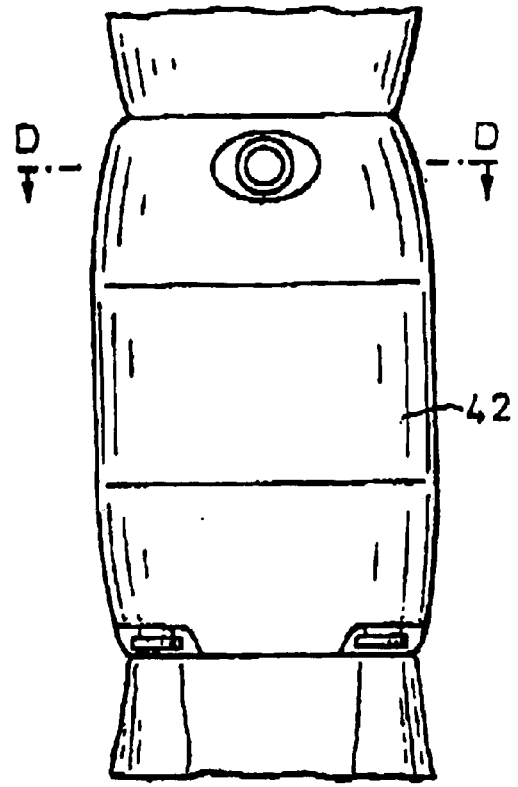
FIG.19
FIG.20
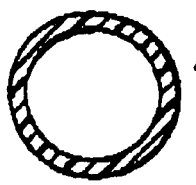
FIG.19a
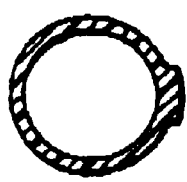
FIG.19b
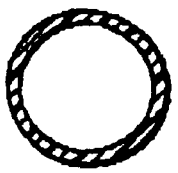
FIG.19c
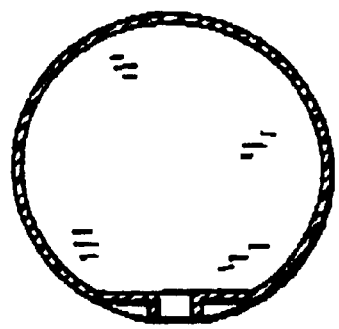
FIG.20a

EXTRUSION HEAD

BACKGROUND OF THE INVENTION

The invention relates to an extrusion head for producing a tubular parison for the manufacture of blow-molded plastic hollow bodies, including an adjustable ring-shaped tube outlet nozzle with annular nozzle/mandrel gap adjustment elements which permit a targeted adjustment of the nozzle gap for varying the wall thickness of the exiting parison.

Typical examples of such blow-molded parts of thermoplastics, in which customarily a targeted wall thickness adjustment is carried out in longitudinal direction of the tube and in circumferential direction of the tube, include large-volume containers such as, for example, canisters, lidded drums, bung drums or inner receptacles for pallet containers. During ejection of the tubular parison used for such blow-molded parts, the wall thickness of the tube is so adjusted by a rotation-symmetrical nozzle/mandrel gap control mechanism in longitudinal direction of the tube that the wall is slightly thinner toward the lower end and slightly thicker toward the upper end in direction of the discharge valve, because the tube as a consequence of its own weight lengthens by itself when suspended to thereby automatically realize an even axial wall thickness. Superimposed thereto is a partial wall thickness control in circumferential direction which is realized by a double nozzle/mandrel gap control mechanism in the tube in those tube zones which are provided in the blow-molded hollow body for the head and bottom areas at greatly varying degrees of elongation—particularly in the areas which are offset by 90° to the partition plane of the blow mold halves.

With double nozzle/mandrel gap control mechanisms (=two control choices) known heretofore, the wall thickness of such blow molded parts can be controlled over their length with respect to:

uniform radial wall thickness radial and circumferential wall thickness radial wall thickness with axially extending thick and thin areas, and partial longitudinal thick/thin areas.

Various constructions of extrusion heads are known for such tube adjustments by means of nozzle/mandrel gap control, for example from German Pat. No. 26 54 001, U.S. Pat. No. 3,114,932 or U.S. Pat. No. 1,107,628. Although for standard applications, simple conventional or the double nozzle control mechanisms suffice, they lack the capacity to carry out additional influences of the wall thickness. A simple extrusion head is further disclosed in British patent specification 1,107,628 for producing teeth or ribs in the extruded tube for bottles blow-molded from thermoplastic material. By means of V-shaped grooves and teeth formed in the ejector die, the blown bottles should receive in particular a decorative look. The central mandrel can be adjusted axially so that the ejected tube may or may not be acted upon by the teeth. A further adjusting option or possible influence to permit a targeted wall thickness adjustment is, however, not possible.

SUMMARY OF THE INVENTION

It is an object of the present invention to obviate the mentioned drawbacks of the prior art and to improve the extrusion head of the type as described above with a double nozzle/mandrel gap control so as to permit a further additional superimposed wall thickness adjustment of the ejected tube for large-volume plastic containers such as 220 liters drums and—particularly also for asymmetric technical parts such as e.g. plastic fuel tanks (KKB) or for special applications in large cylindrical blow molded parts.

This object is attained in accordance with the invention by providing at least three separate nozzle/mandrel gap adjustment elements (D 0=mandrel, DS I, DS II, DS III) which are separately controlled, differently profiled, and adjustable, and which individually or/and simultaneously can be brought into active engagement in the nozzle gap with the exiting parison from inside and outside.

Since the tube outlet nozzle is equipped with a triple nozzle/mandrel gap control mechanism, special thick areas can be so adjusted at particular locations of the tube depending on the blow molded hollow body in dependence on the configuration of the third nozzle/mandrel gap adjustment element, or further adjustment elements and on the duration of the intervention or impact on the extruded parison, that the final blow molded hollow body exhibits only in the desired wall regions different or thicker wall thickness in comparison to the minimum wall strength of the typical wall.

A canister can, for example, be provided with stiffening ribs only at the vertical corner areas. In a KKB, the walls can also be made specifically thicker and thus more stable, e.g. in the side areas of the top bottom or at those areas at which connection stubs of fuel pipes are blow-molded thereon, or measuring instruments for a fuel tank level gauge are to be installed. In bung drums or lidded drums, it is possible to adjust a ribbed wall construction with uniform thick-thin distribution only in the vertical wall areas through a targeted material redistribution while, for example, maintaining the existing drum weight, thereby measurably improving the stiffness of the container, and in particular, the stacking strength when charged with hot contents. This is especially of particular importance in connection with large-volume drums (220 liters). Remarkably, the steps for quality improvement of the blow-molded hollow plastic body are realized exclusively on the exiting parison itself and not through constructive redesign of the blow mold.

As shown by way of example only, the novel triple or multi-nozzle/mandrel gap adjustment elements according to the novel invention results advantageously in a variety of new possibilities of application for large-volume blow-molded plastic parts of all types (e.g. automobile accessories or the like).

Compared to a conventional extrusion head with heretofore dual nozzle/mandrel gap adjustment elements, the provision of an extrusion head with the novel triple nozzle/mandrel gap adjustment elements according to the invention can be realized comparably inexpensively and does not require any investment in machines. The adjustment elements are moved only over very short distances, and only simple control motors are sufficient, and no deformation of the adjustment elements is experienced.

The process according to the invention for producing blow-molded hollow plastic bodies by a blow mold machine with extruder, extrusion head with circumferential distributor and respective blow mold, and carrying out a particular adjustment of the wall thickness of the exiting parison during ejection of the tubular parison from the extrusion head through adjustment of the nozzle/mandrel gap, is characterized in particular by realizing a random, circumferentially varying thick-thin adjustment of the tubular parison through a sequential or simultaneous impact of three differently profiled, separately adjustable nozzle/mandrel gap adjustment elements. This multiple adjusting capability of the tube for large-volume drums is unique and results in a quality of the drums that has been unattainable to date.

BRIEF DESCRIPTION OF THE DRAWINGS

The invention will now be explained and described in more detail by way of exemplified embodiments illustrated only schematically in the drawings, in which:

FIGS. 7 to 9 show a modified embodiment of an extrusion head with different operational positions of the nozzle/mandrel gap adjustment elements;

FIG. 19 shows a tubular parison with cross sections; and

FIG. 20 shows a cross sectional illustration of a schematically illustrated plastic fuel tank (KKB).

DETAILED DESCRIPTION OF PREFERRED EMBODIMENTS

Figure 1:
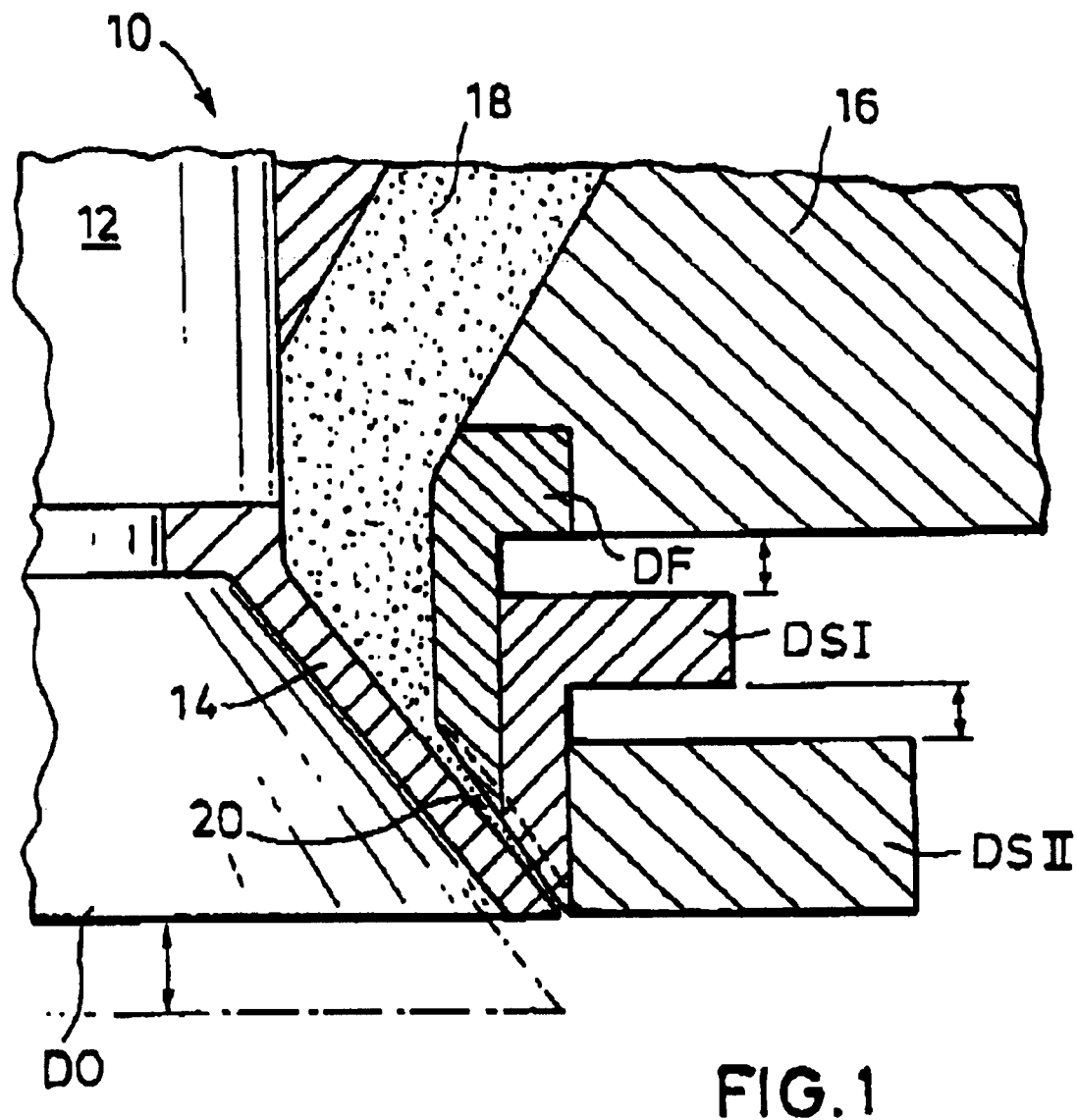
FIG. 1 shows a partially sectional illustration of an extrusion head according to the invention.

FIG. 1 shows an extrusion head 10 with fragmentary illustration of three adjustable nozzle/mandrel gap adjustment elements D 0, DS I and DS II in the basic position "nozzle gap closed". Arranged centrally in the extrusion head 10 is an axially adjustable mandrel holder 12 with an underside which has secured thereon an easily detachable and exchangeable truncated cone shaped mandrel 14 as first nozzle/mandrel gap adjustment element Dzero (=D 0). To the outside, the extrusion head is enclosed by a housing 16. Accommodated in the housing 16 is a hollow cylindrical storage space 18 in which the molten plastic material fed from one or several extruders has been circumferentially distributed. The storage space 18 ends in a circular ring-shaped nozzle gap 20 which is demarcated on the inside by the mandrel 14, and the first nozzle/mandrel gap adjustment element D 0 and on the outside by a stationary nozzle ring part DF and two adjustable nozzle/mandrel gap adjustment elements, namely the nozzle slide 1=DS I and the nozzle slide 2=DS II. Like the adjustable mandrel 14, also the axially adjustable adjustment elements DS I and DS II are secured to the extrusion housing for easy detachment and exchange. The axial adjustment and exact positioning of the adjustable nozzle/mandrel gap adjustment elements may be realized e.g. hydraulically or electromotorically. Furthermore, the housing-fixed nozzle ring part DF is likewise secured to the extrusion head in a manner that permits easy detachment and exchange.

This is of particular importance in order to realize during a product change or replacement of the subsequent blow mold also a rapid exchange of the ring parts and adjustment elements of the nozzle gap, which are suited to the product at hand and accordingly profiled.

In the extrusion head 10 shown in FIG. 1, all nozzle/mandrel gap adjustment elements are returned to their basic position "nozzle gap closed", i.e. the mandrel D 0 has traveled to the uppermost position, and the nozzle slide= adjustment elements DS I and DS II have traveled to the lowermost position. The respective lengths of path= adjustability of the adjustment elements, are indicated by the respective arrows. In the illustrated exemplified embodiment, the nozzle gap defining surfaces of the fixed nozzle ring part DF and the adjustment element DS I are profiled, and the nozzle gap defining surfaces of the mandrel D 0 and of adjustment element DS II have smooth circumference, as further described with reference to the following Figures.

Figure 2:
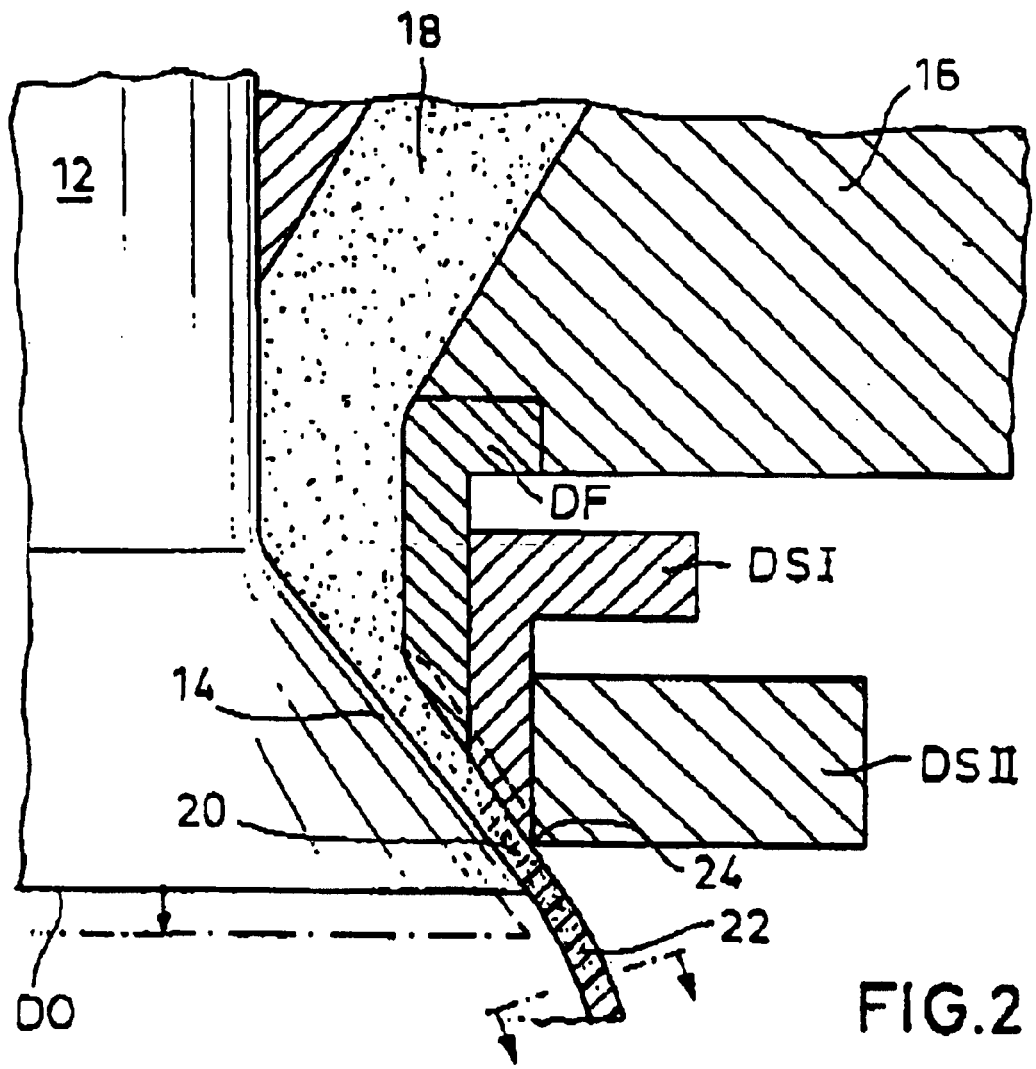
FIGS. 2 to 6 show the extrusion head according to FIG. 1 with different operational positions of the adjustment elements.
Figure 2A:
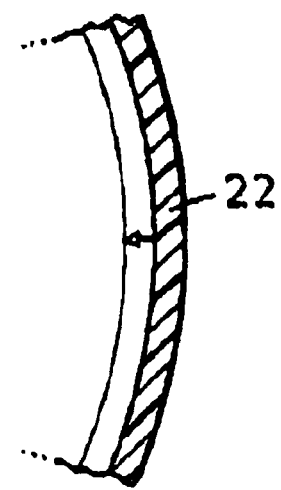

In FIG. 2, only the mandrel 14 is slightly moved downwards (see arrow). The nozzle gap 20 is demarcated at the outside by the lower inner circumferentially smooth edge 24 of the nozzle slide DS II, and at the inside by the mandrel 14. The discharged tube 22 is evenly thin about its circumference. In the partial section of the tube 22, as illustrated therebelow in FIG. 2a, a small arrow indicates the potential thickness of the tube when the mandrel travels to the lowermost position and the nozzle gap is fully open.

Figure 3:
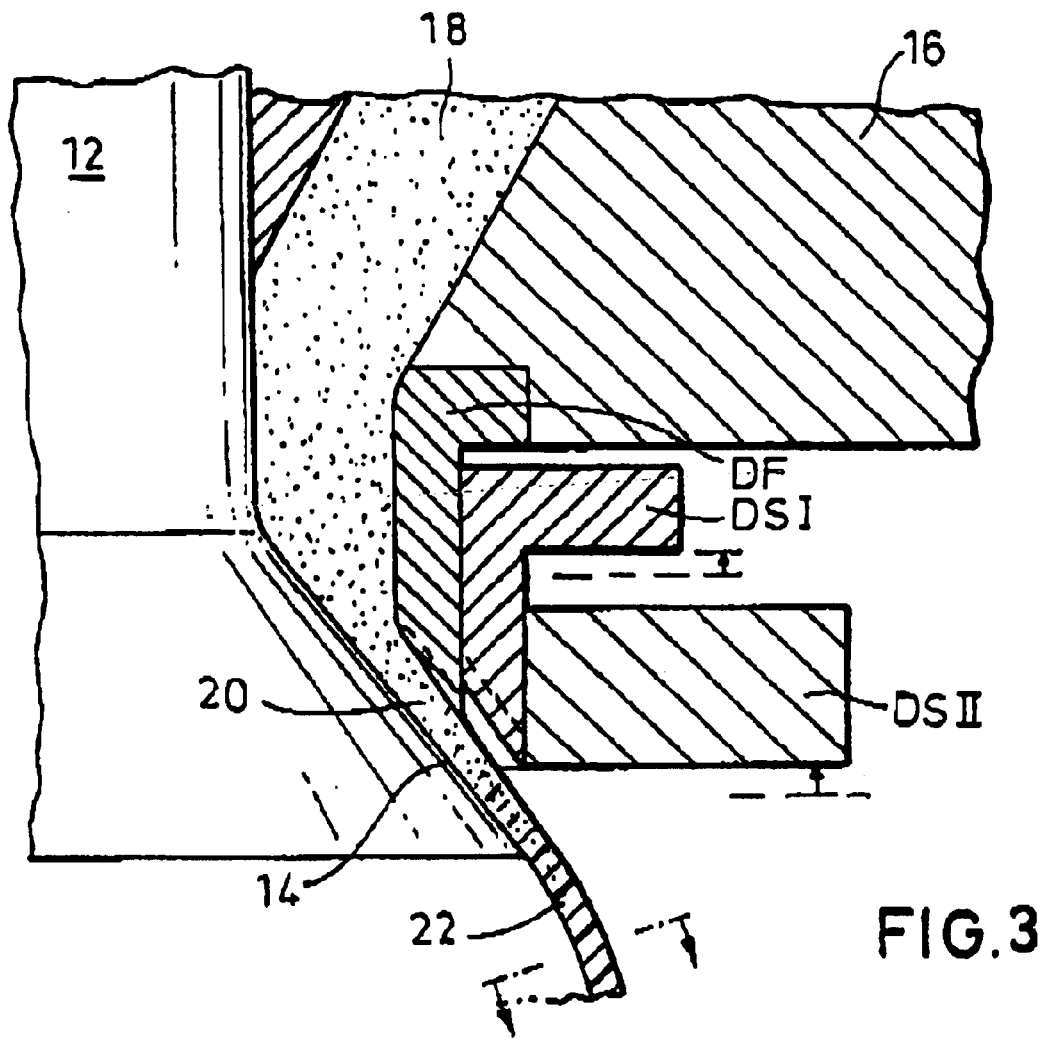
Figure 3A:
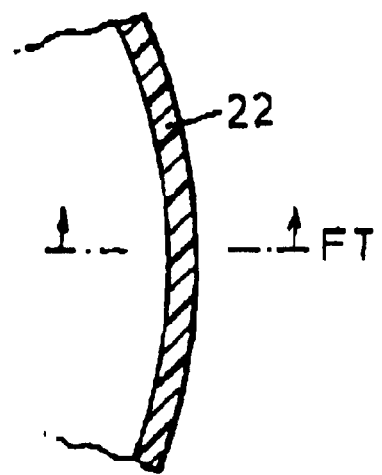

In FIG. 3, the adjustment element DS I together with the adjustment element DS II is slightly moved upwards (see arrow), so that these two adjustment elements are not in operative engagement at that point with the exiting tubular parison 22. The nozzle gap 20 is now demarcated by the mandrel 14 and the profiled housing-fixed ring part DF. The tube exiting the nozzle gap is no longer uniformly thick in circumferential direction, but is slightly thinner in two opposing regions than the respective tube regions respectively arranged offset by 90° thereto (FIG. 3a). Such a double-oval adjustment of the nozzle gap or oval wall thickness adjustment in areas of the tube is typical for blow molded parts with flat top plate and bottom plate, whereby, the two opposing tube sections 26 with greater wall thickness are so guided between the open blow mold halves that the horizontal container wall areas, which are offset by 90° to the mold partition plane, are blow-molded therefrom with the greatest stretching degrees and blow paths of the plastic material. This feature thus serves as a measure to attain a uniform wall thickness in the finished container, so that the container wall is not thinner in the corner areas with high degrees of stretching or orientation in comparison to the remaining vertical wall parts. FIG. 3 illustrates a sectional view through the thinner tube area (and extrusion head) which bears in the blow mold in the mold partition plane upon the blow mold wall.

Figure 4:
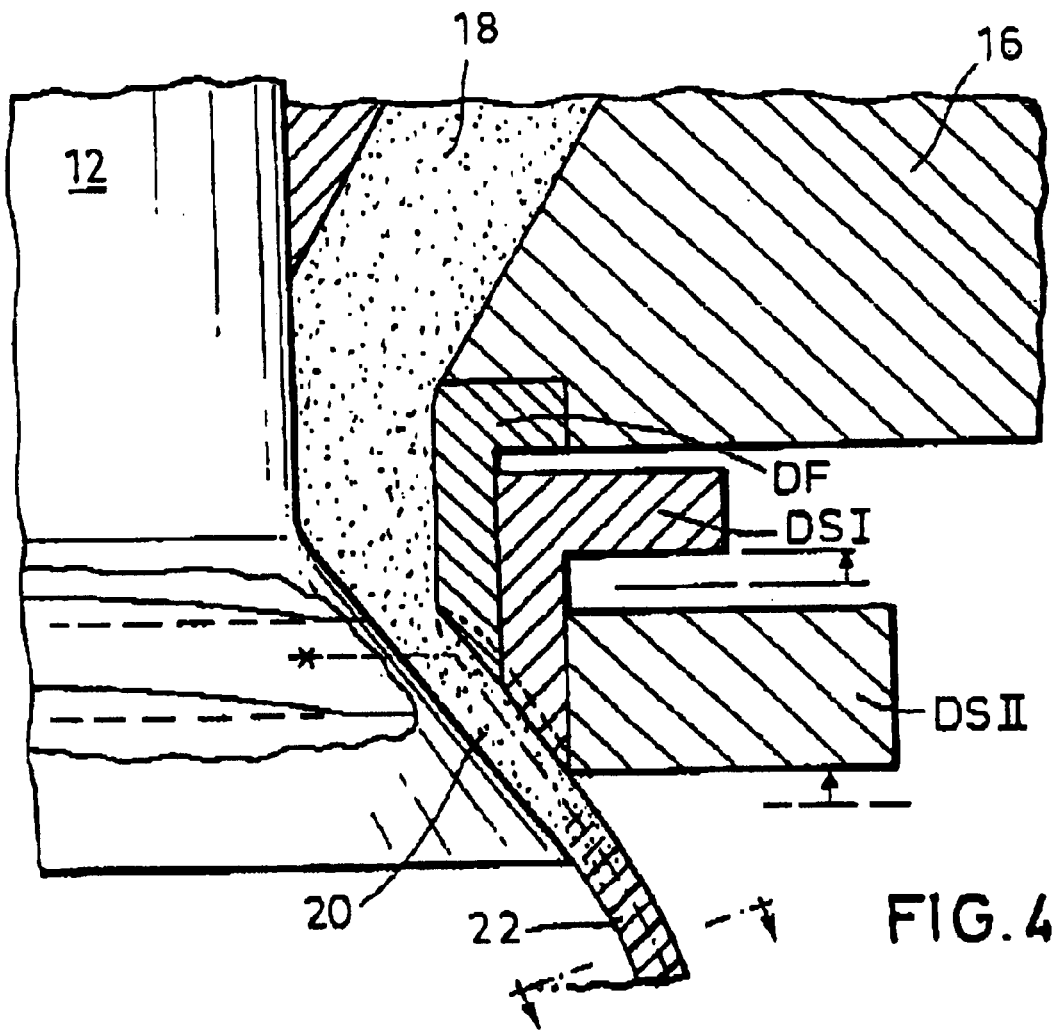
Figure 4A:
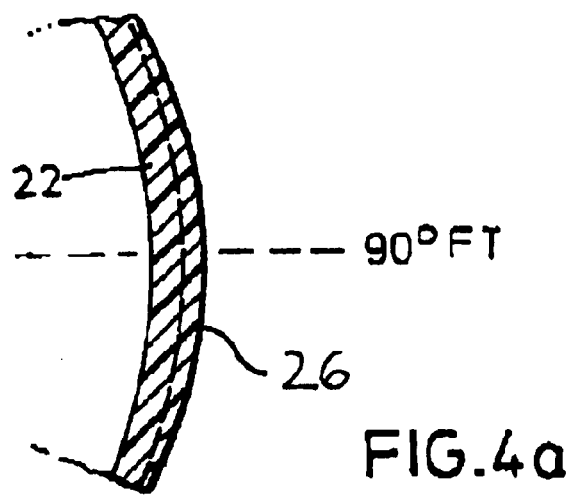

FIG. 4 shows the same position of the nozzle/mandrel gap adjustment elements compared to FIG. 3, but at a 90° rotated section through the extrusion head and thus through a thicker wall zone 26 of the tube 22, as clearly illustrated by the partial sectional view through tube 22 therebelow as seen in FIG. 4a. To the left, next to the profiled ring part DF, there is indicated a developed view of the known wavy profile of the inner nozzle surface of the ring part DF.

Figure 5:
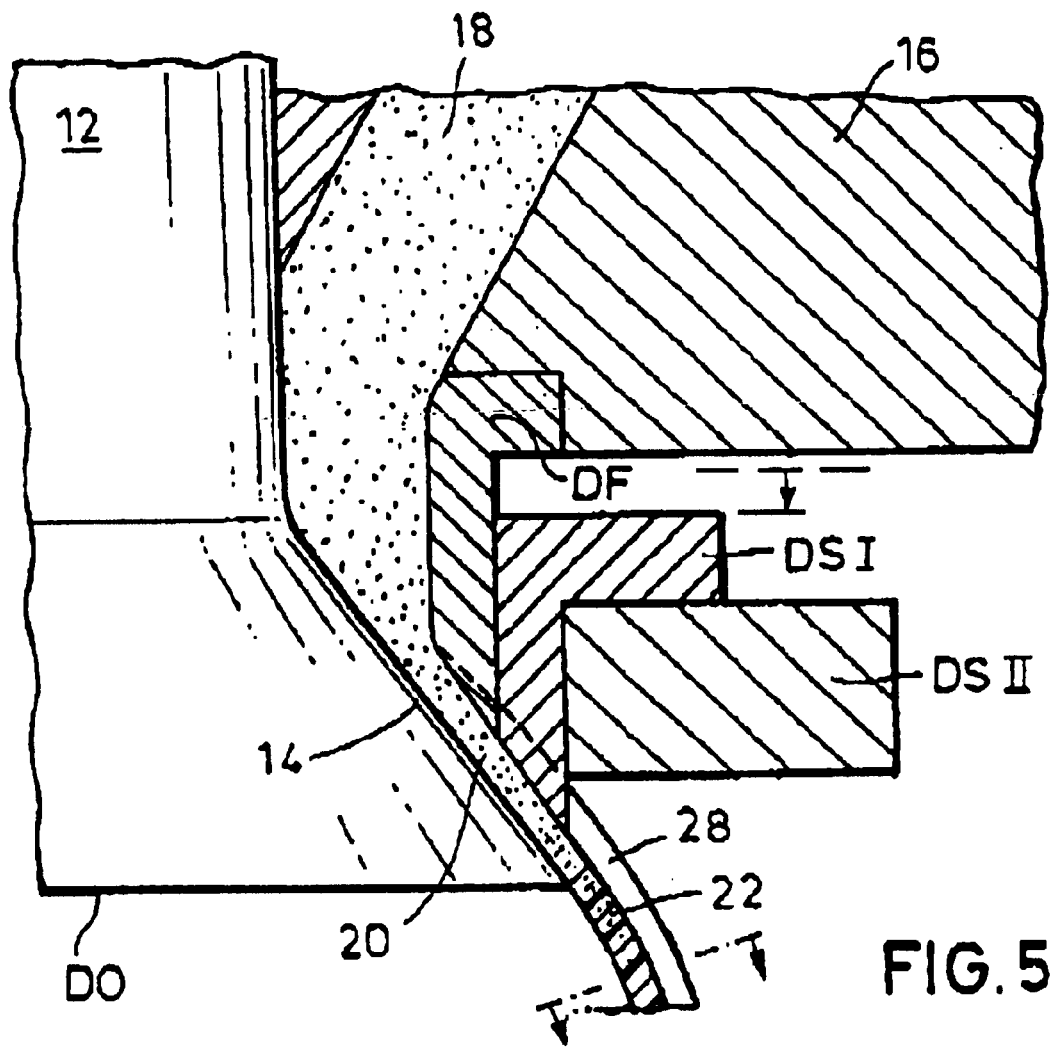
Figure 5A:
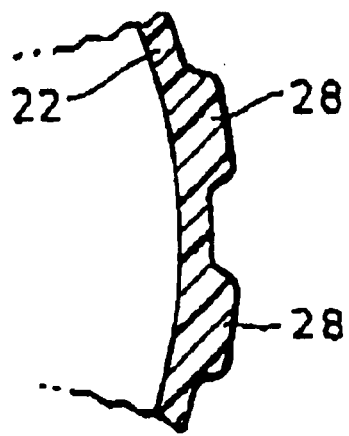
Figure 6:
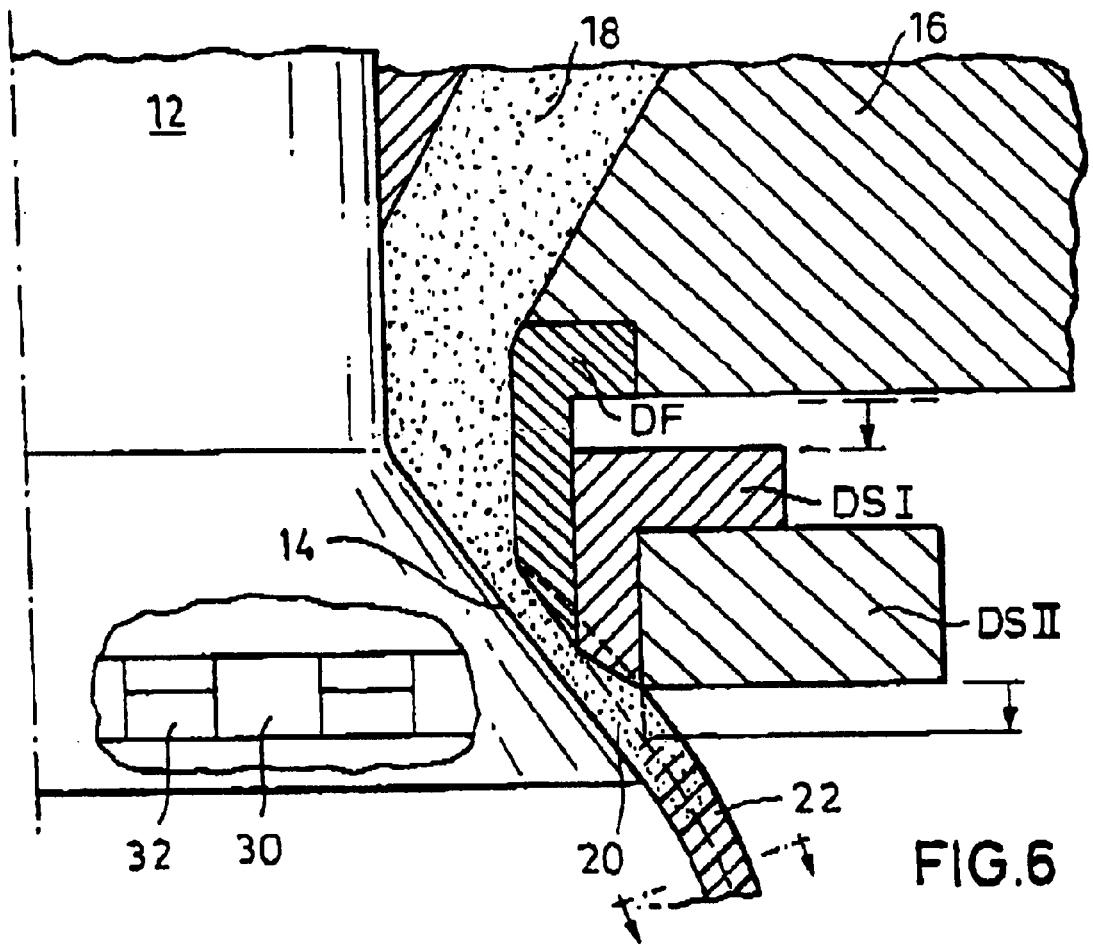
Figure 6A:
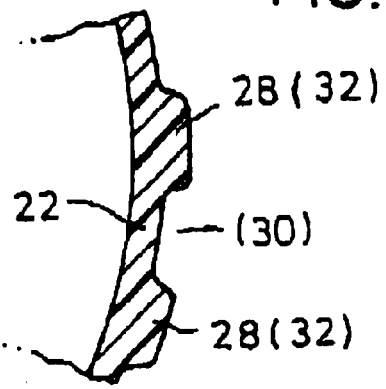

In FIG. 5 and FIG. 6, the profiled nozzle slide DS I is moved downwards and acts on the exiting plastic tube, while the nozzle slide DS II still remains in its previous upper position outside a zone of influence. The profile of DS I includes a circumferential tooth profile, as clearly shown therebelow in FIG. 5a by the partial sectional illustrations of the exiting tube 22. The teeth 30 of the profile form a thinner tube wall thickness, and a greater tube wall thickness with outwardly projecting ribs is formed in the tooth gaps 32. FIG. 5 shows the section through the extrusion head and the tube 22 in the area of a thinner tube wall (tooth action 30), and FIG. 6 shows a slightly offset section in the area of a thicker tube wall (tooth gap action 32), with pronounced formation of longitudinal ribs 28 (FIG. 6a). The profile in the fixed nozzle ring part DF, as well as in the nozzle slide DS may be expanded slantingly outwardly or simply parallel to the surface of the mandrel 14. FIG. 6 indicates by way of the small arrow below the nozzle guide DS II, the depth by which the teeth 30 of the tooth profile of the nozzle slide DS I are able to act on the tube 22 from outside. To the left of the nozzle slide DS I is a schematic illustration, in developed view, of the tooth profile of the DS I with teeth 30 and tooth gaps 32. In this embodiment, the lowermost non-profiled nozzle slide DS II, serves actually only as a smoothening element or to cover the profiles of the ring part DF or/and to cover the nozzle slide DS I.

FIG. 7, FIG. 8 and FIG. 9 illustrate a modified embodiment of an extrusion head according to the invention, with the special profile (=tooth profile) formed on the nozzle slide DS II instead of on the nozzle slide DS I, while the nozzle slide DS I has a smooth circumferential surface in direction of the nozzle gap. In FIG. 7, both nozzle slides DS I and DS II are moved into their uppermost position (outside of zone of influence), and only the oval-profile of the housing-fixed ring part DF and the adjustable mandrel 14 act on the tube 22 in the nozzle gap 20. The small partial sectional views 7a and 7b on the side indicate on the left (7a) a thinner tube wall thickness (in mold partition plane FT) and on the right (7b) a thicker tube wall thickness (90° with respect to the mold partition plane FT). In FIG. 8, both nozzle slides DS I and DS II are moved downwards. The DS I has a lower smooth circumference and covers the oval-profile of the fixed ring part DF, thereby rendering it ineffective. The tooth profile of the lower nozzle slide DS II acts in the nozzle gap 20 on the exiting tube 22 and produces the profiled tube formation with the longitudinal ribs 28, as illustrated in the small partial sectional illustration in FIG. 8a.

FIG. 9 shows a positioning of the adjustment elements in which no profile is effective, but rather only a circumferentially even change of the wall thickness can be carried out by an axial displacement of the mandrel 14. In accordance with the wall thickness diagrams FIGS. 9a, b, and c, which illustrate for each adjustment element a separate control program, as shown in the lower left hand side of FIG. 9, the control of adjustment elements D 0, DS I and DS II for adjusting a desired wall thickness over the length L of the exiting tube is effected at the blow form machine. Diagram 9a shows—as does the partial sectional view FIG. 9f to the right of the ejected tube 22—an even increase of the wall thickness from bottom to top, by opening the nozzle gap 20 through axial displacement of mandrel 14 in downward direction. The added wall thickness for the top plate and bottom plate of the drum, as shown in diagram 9b, is realized by the oval profile in the fixed nozzle ring part DF which is cleared when the non-profiled and smooth nozzle slide DS I travels upward. At that point, the tooth profile nozzle slide DS I is hereby not effective. For adjustment of the tooth profile in the tube—e.g. for longitudinal ribs in the vertical wall region of the bung drum as shown to the right thereof in FIG. 9d and e—the nozzle slide DS II is moved downwards for active engagement, whereby also the nozzle slide DS I moves downwards, thereby covering again the profile of the fixed ring part DF. In order to maintain an even thickness of the tube, the mandrel 14 is also moved simultaneously slightly downwards, and the nozzle gap opened as needed. For clarification, it should be noted that the nozzle slide with the novel tooth profile of the nozzle slide realizes in general only a redistribution of the plastic material in the nozzle gap, whereby the free cross sectional area of the nozzle gap may remain constant.

Figure 10:
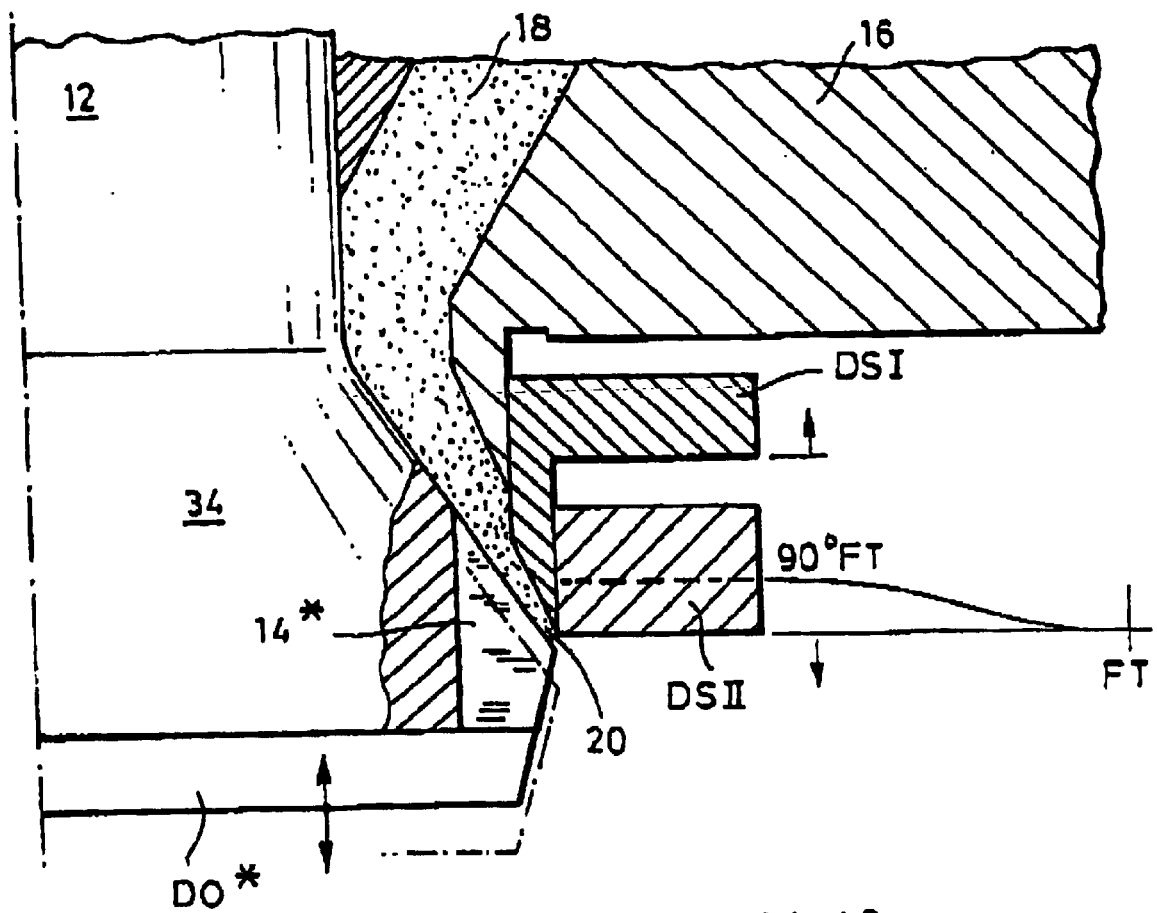
FIG. 10 shows a further modified embodiment of an extrusion head.

Another embodiment of an extrusion head according to the invention is shown in FIG. 10, whereby no profiled housing-fixed ring part is provided and the nozzle slide DS I is also not profiled but exhibits a circumferentially smooth inner surface towards the nozzle gap 20. The known oval profile is formed in the nozzle slide DS II, with an exchangeable mandrel 34 having a special configuration. At its outer circumference, the mandrel 34 is provided in direction of the nozzle gap 20 with a plurality of ribs 14*, which are evenly spaced from one another in a star-shaped manner, and interposed grooves. Disposed at the lower end of the mandrel head 34 is the axially adjustable adjustment element D 0* which is provided exteriorly with correspondingly formed ribs extending upwardly and uniformly spaced from each other for precisely filling in flush engagement the grooves and intermediate spaces between the ribs 14*. When the star-shaped slide=adjustment element D 0* occupies its uppermost basic position, the ribs of star-shaped slide D 0* extend in the nozzle gap 20 flush with the ribs 14* of the mandrel 34, so that the interlocking ribs of the mandrel head 34 form a smooth conical surface in the nozzle gap. In contrast thereto, when the star-shaped slide D 0* travels downwards, the intermediate spaces between the ribs and the grooves of the mandrel head 34 are cleared and the stationary ribs 14* act in the nozzle gap on the exiting tube 22, thereby forming a tooth profile in the inner surface of the tube in dependence on the geometry of the ribs 14*. An up and down movement of the smooth non-profiled nozzle slide DS I allows, in general, an even adjustment of the wall thickness, while the oval profile of the tube is effected by the respectively profiled nozzle slide DS II, whereby the nozzle slide DS II travels into a lower position, with the minimum wall thickness of the tube being adjusted by the nozzle slide DS I. Then, DS II remains in position, and DS I travels slightly upwards, whereby the oval profile in DS II is cleared, and the tube is formed with respectively thicker walls in the two diametrically opposing zones. This construction of the extrusion head permits a best possible superimposed action of the various adjustment elements upon the tube.

Figure 11:
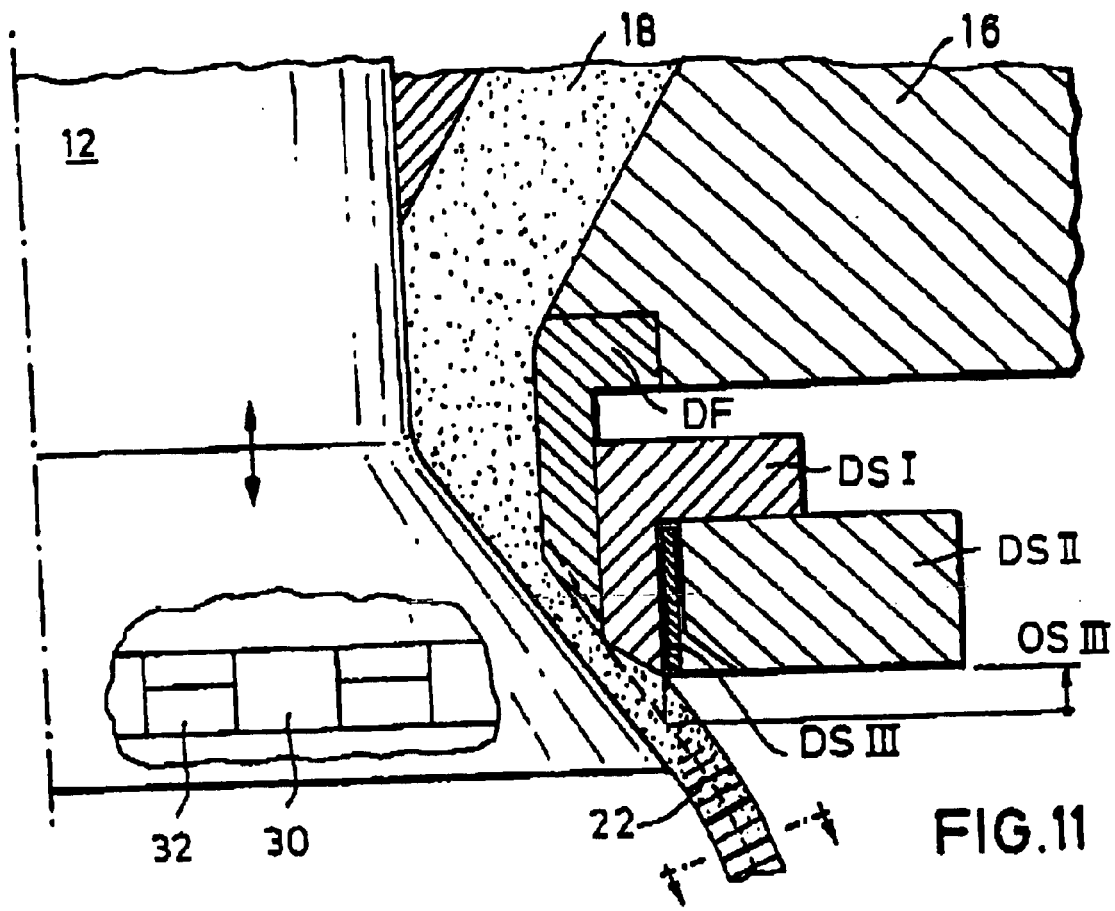
FIG. 11 shows a fourth modified embodiment of an extrusion head.
Figure 11A:
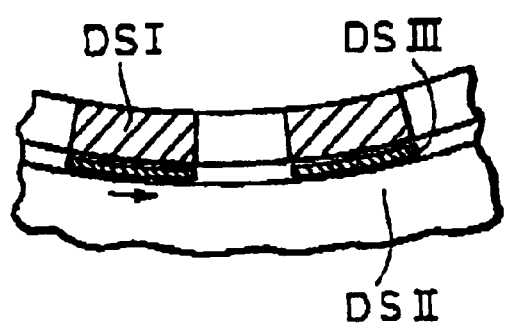
Figure 11B:
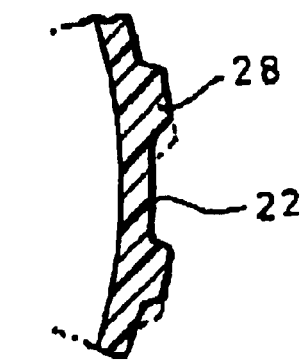

A further embodiment is shown in FIG. 11, illustrating a modification of the extrusion head shown in FIG. 6, with a ring sleeve as nozzle slide DS III being secured inside the nozzle head DS II for adjustment in circumferential direction. This ring sleeve=DS III has at its bottom side a same tooth profile as the nozzle slide DS I disposed on the inside; see FIG. 11a. Additionally, the nozzle slide DS II is slightly slanted inwardly at the bottom. When downwardly moving the nozzle slide II together with ring sleeve DS III so as to be flush with the nozzle slide I, a rotation of the ring sleeve enables a covering or opening of the teeth of the nozzle slide DS I from the side. In this way, the formation of the rib width on the exiting tube 22 can be continuously modified or randomly adjusted. A simultaneous up and down movement of the nozzle slide DS II together with the ring sleeve DS II also allows the height of the ribs 28 (FIG. 11b) to be continuously modified and adjusted.

Figure 12:
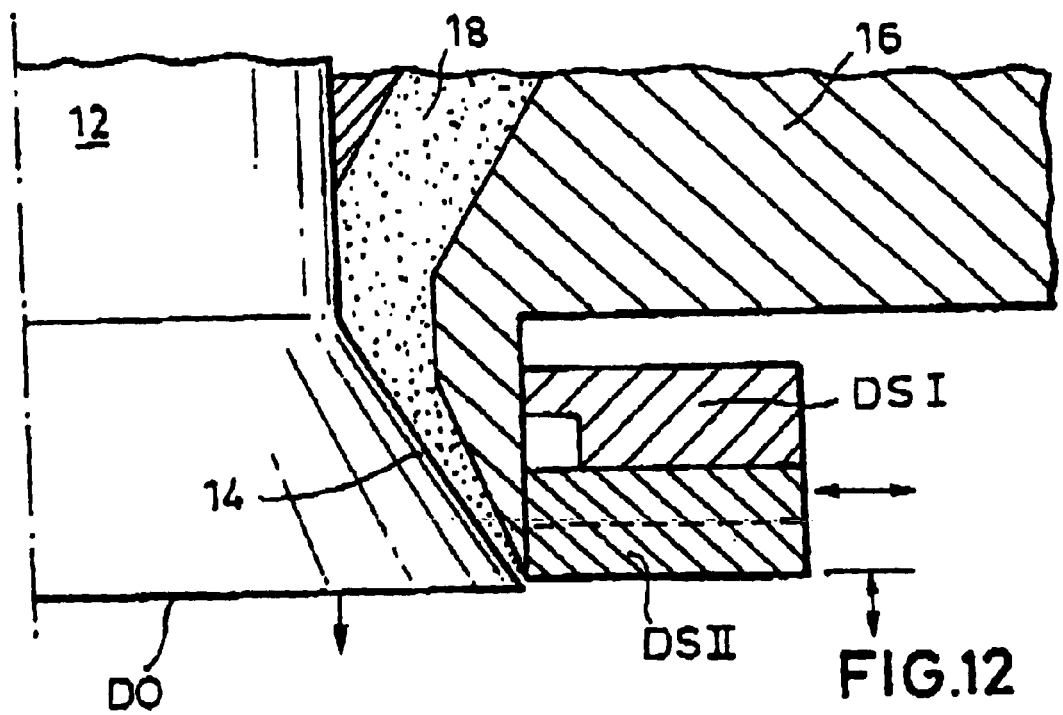
FIGS. 12 to 15 show a fifth modified embodiment of an extrusion head with different operational positions of the nozzle/mandrel gap adjustment elements.
Figure 13:
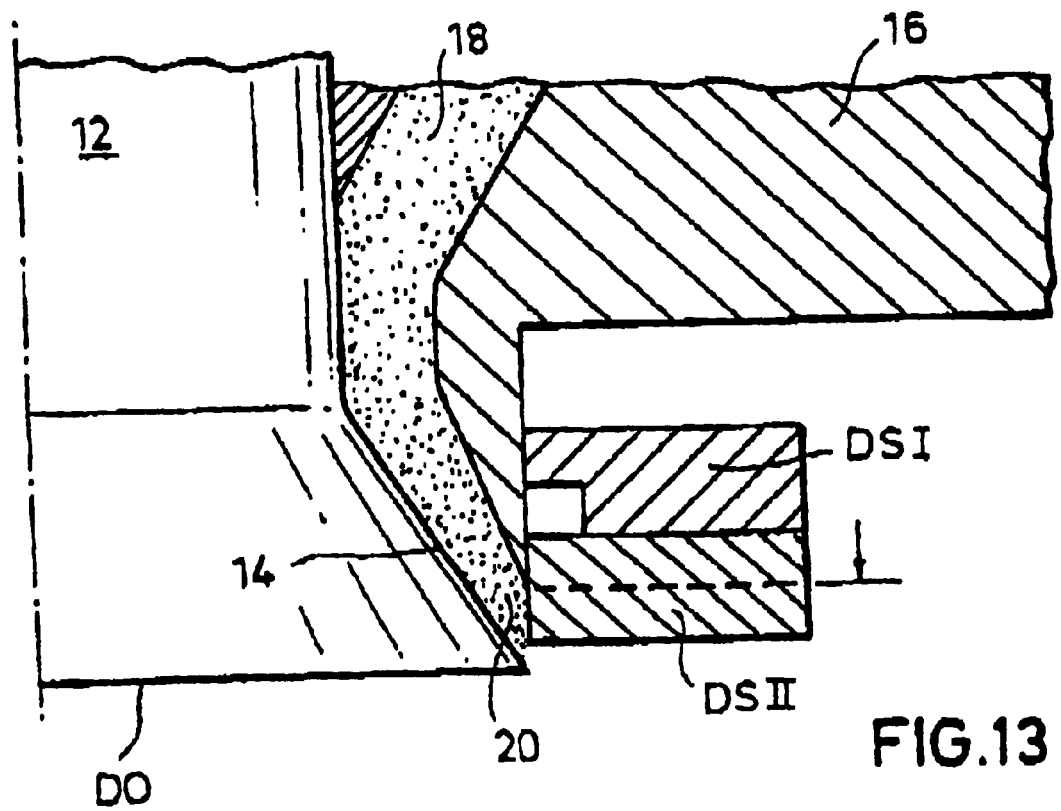
Figure 14:
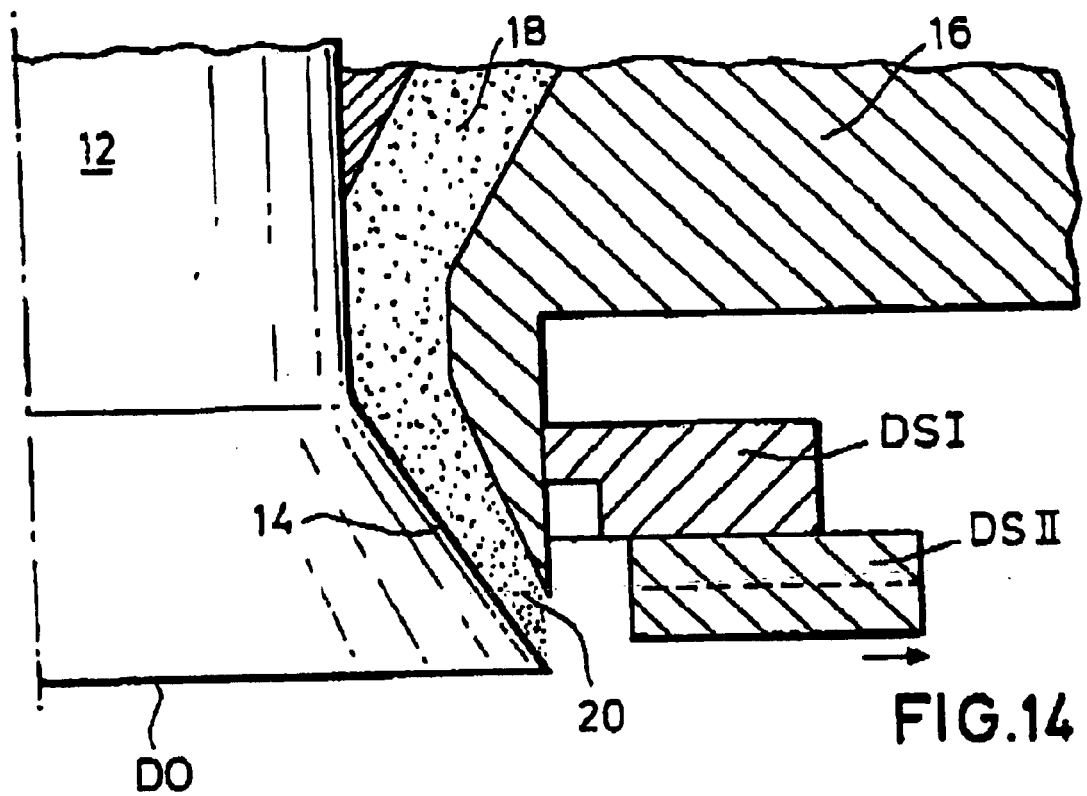
Figure 15:
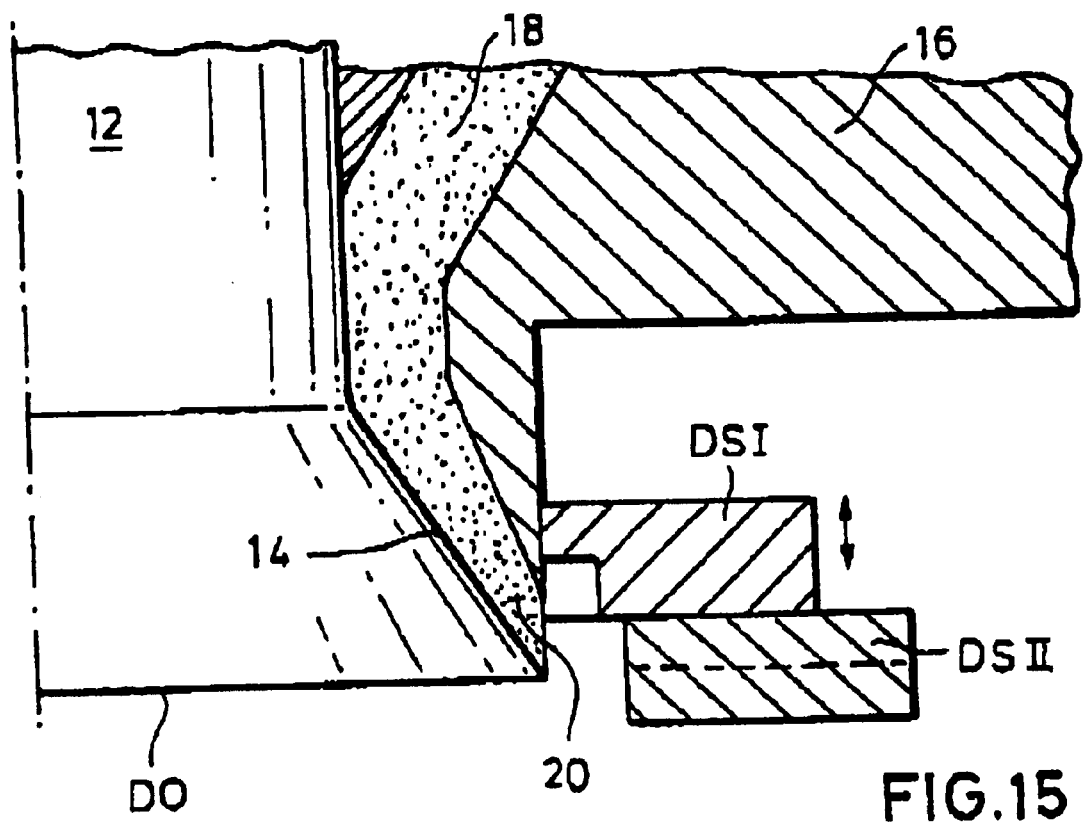

Finally, FIG. 12, FIG. 13, FIG. 14 and FIG. 15 show a further advantageously configured extrusion head. The even wall thickness about the circumference is adjusted with the adjustment elements D 0=mandrel 14. A profiled housing-fixed ring sleeve is not provided; however, if needed, may be provided for installing a further special profile. The nozzle slide DS I has the tooth profile and is provided with a greater stroke of its adjustment drive. Furthermore, the nozzle slide DS II is provided with the oval profile and of split configuration i.e. it is made in this case of two 180° half ring parts which are guided and secured on the nozzle slide DS I for displacement in radial direction. In FIG. 12, all adjustment elements have traveled into the basic position "nozzle slide closed". In FIG. 13, the nozzle gap is opened, with mandrel 14 having traveled downwards. Likewise, the nozzle slide DS I together with DS II have traveled axially downwards, with the attached nozzle slide DS II acting with its oval profile in the nozzle gap 20 on the exiting tube. In FIG. 14, both half ring parts of the nozzle slide DS II have traveled radially outwards and are no longer in an active engagement. As shown in FIG. 15, the nozzle slide DS I is now slightly moved further downwards until its tooth profile or special profile is in active engagement. The advantage of this construction is the need for only a single lifting drive for the nozzle slides DS I and DS II. The short radial movement of the DS II—half rings could be realized, for example, by an electric spindle motor or a respective small drive. This configuration is suited e.g. particularly for retrofitting existing extrusion heads.

The adjustment elements of all embodiments are basically attached to the extrusion head in an easily exchangeable manner. The nozzle slide with the tooth profile may certainly also be modified depending on the desired profile requirement of the hollow body to be blow-molded (cf. FIGS. 19, 20).

Figure 16:
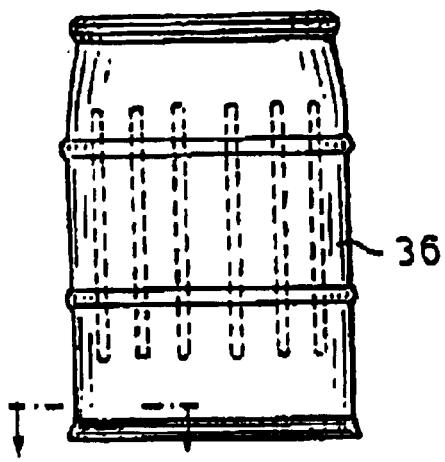
FIG. 16 shows a lidded drum as blow-molded hollow body.
Figure 16A:
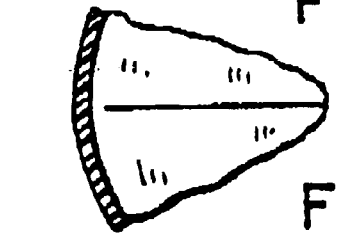

FIG. 16 illustrates a 220 liter lidded drum 36 having longitudinal ribs which are formed in the vertical wall zones and evenly spaced from one another but which do not extend into the bottom region, as shown in the sketched partial sectional illustration below in FIG. 16a with constant drum wall thickness.

Exemplified embodiment: A 220 l plastic drum (e.g. Vanguard lidded drum) with a drum body weight of approximately 7.5 kg has a largest diameter in the drum wall or foot ring of about 575 mm. The swelling parison exiting the nozzle gap has a diameter of about 270 mm with a wall thickness of about 12 to 25 mm. By means of the adjustment elements, the wall thickness of the tube can be adjusted partially or along sections in this thickness range or adjusted at even greater range. Hereby, the particular adjustment element D 0* is advantageously provided with a rectangular tooth profile, whereby the diameter of the adjustment element D 0* amounts to about 190 mm, and the inner and outer ring edges, interacting with the ejected tube, have alternately about 60 grooves which are half-round as viewed in cross section, and a complementary number of rectangular teeth, with the width of the grooves being about 4 mm and the width of the teeth about 5 mm. The radial depth of the grooves is thereby about 10 mm. The configuration of the rectangular teeth is hereby of importance; a toothed engagement with pointed saw teeth is unsuitable for large-volume containers according to the invention with a diameter of about 585 mm and a weight of about 8 to 10 kg plastic material, because the extension of the thinner areas in circumferential direction of the drum body must be wider in any case than the thicker areas (=internal ribs) in the axial drum wall of the finished blow-molded hollow body.

Figure 17:
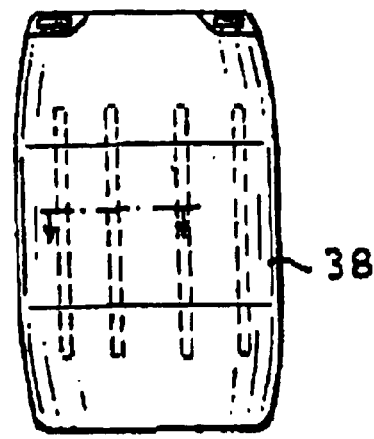
FIG. 17 shows a fassett (canister of upright size) as blow-molded hollow body.
Figure 17A:

FIG. 17 shows a fassett 38 in which only the vertical wall zones are reinforced by longitudinal ribs. This longitudinal ribbing is clearly illustrated in the partial sectional illustration in FIG. 17a through the container wall.

Figure 18:
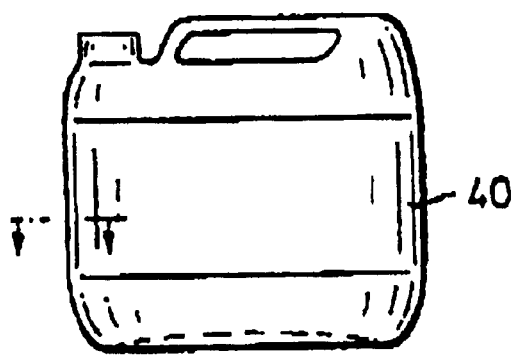
FIG. 18 shows a canister (jerrican) as blow-molded hollow body.
Figure 18A:
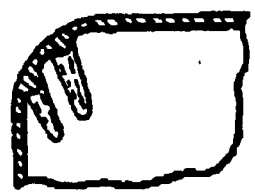

FIG. 18 shows a canister 40 formed only in the corner regions with two longitudinal ribs which extend, however, to the top plate and bottom plate, as indicated in the partial sectional view below in FIG. 18a. A longitudinal and cross-sectional view of a tubular parison 22 with special profile for a plastic fuel tank KKB 42 is shown in FIG. 19, with FIG. 20 showing flash pieces still attached thereto.

The extrusion head according to the invention with three separate adjustment systems is particularly suitable to fabricate and produce such special profiles with partial material accumulation (cf. section A—A, B—B and C—C in FIG. 19a, b, c) as required for KKB 42 in the area of a stub opening (cf. section D—D in FIG. 20 as shown in FIG. 20a).

What is claimed is:

1. An extrusion head for producing a tubular parison for the manufacture of blow-molded plastic hollow bodies, comprising:

an adjustable ring-shaped tube outlet nozzle including at least three separate, exchangeable adjustment elements of different profile for defining a nozzle gap to vary a wall thickness of an exiting tube, wherein the adjustment elements are moveable to act independently or commonly on the tube; and at least two adjustments drives for cooperation with at least a first one and a second one of the adjustment elements, whereby the adjustment drives and the adjustment elements are placed into one-to-one correspondence, wherein one of the three adjustment elements is a mandrel which has a lowermost outer edge, wherein the other two of the adjustment elements are disposed to define an upper adjustment element and a lower adjustment element, with the lower adjustment element having a lowermost inner edge which is intended for engagement with the exiting tube and is disposed in level with or slightly above a lowermost outer edge of the mandrel, and a further moveable adjustment element located between the upper and lower adjustment elements and supported for rotation in circumferential direction.

2. The extrusion head of claim 1, wherein a third one of the adjustment elements is disposed below the second adjustment element and configured for realizing a special profile, wherein the third adjustment element acts last on the tube to influence the wall thickness of the tube.

3. The extrusion head of claim 2, wherein the special profile is a tooth profile.

4. The extrusion head of claim 1, and further comprising a drive assembly operatively connected to the third adjustment element for shifting the third adjustment element in axial direction.

5. The extrusion head of claim 1, wherein the adjustment elements are configured for quick attachment to permitting easy exchange.

6. The extrusion head of claim 4, wherein the third adjustment element is of split configuration and comprised of two 180° half-ring segments, wherein the drive assembly includes two adjustment drives for moving the half-ring segments in a radial direction, whereby the adjustment drives and the half-ring segments are placed into one-to-one correspondence.

7. The extrusion head of claim 1, wherein the further adjustment element has a same profile as the upper adjustment element.

8. The extrusion head of claim 7, wherein the profile is a toothed profile.

9. The extrusion head of claim 1, and further comprising a holder supporting a third one of the adjustment elements for movement in an axial direction, wherein the third adjustment element is formed with a special profile.

10. The extrusion head of claim 9, wherein the special profile is a toothed profile.

11. The extrusion head of claim 9, wherein one of the adjustment elements is configured with a smooth circumferential surface, another one of the adjustment elements has an oval profile, and another one of the adjustment elements has a special profile.

12. The extrusion head of claim 11, wherein the special profile is a tooth profile.

13. The extrusion head of claim 1, for making a 220 liter drum with an outer diameter of about 585 mm and a drum weight of about 9.5 kg, wherein one of the adjustment elements has a rectangular tooth profile and a diameter of about 190 mm, wherein the one of the adjustment elements has inner and outer ring edges interacting with the exiting tube and having alternately about 60 grooves of half-round configuration, as viewed in cross section, and a complementary number of rectangular teeth, with a width of the grooves being narrower than a width of the teeth.

14. The extrusion head of claim 13, wherein the width of the teeth is about 5 mm, the width of the grooves is about 4 mm, and wherein the grooves have a radial depth of about 10 mm.

15. The extrusion head of claim 1, wherein the tube shaped outlet nozzle is bounded at one side by a central mandrel and one gap adjustment element and on a corresponding opposing side by two adjustment elements; and wherein each gap adjustment element can be moved one of, separately or simultaneously, into active engagement with the exiting parison in the nozzle gap from the one side and from the opposing side to thereby vary the wall thickness of the exiting parison.

* * * * *